US011112037B2

(12) United States Patent
Sanchez Del Valle et al.

(10) Patent No.: US 11,112,037 B2
(45) Date of Patent: Sep. 7, 2021

(54) HOSE CONNECTION SYSTEM (71) Applicant: General Electric Company, Schenectady, NY (US)

(72) Inventors: Luis Armando Sanchez Del Valle, Atlanta, GA (US); Brian Kenneth Bassett, Greenville, SC (US); Robert Scott Phillips, Greenville, SC (US); Jesse Ellis Barton, Fountain Inn, SC (US); Peter Koppenhoefer, East Stroudsburg, PA (US); Michael F. Dolan, Jr., Manasquan, NJ (US); Nathan Lynn Green, Galloway, OH (US); Le Yu, Dublin, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 432 days.

(21) Appl. No.: 15/883,414

(22) Filed: Jan. 30, 2018

(65) Prior Publication Data

US 2019/0234541 A1 Aug. 1, 2019

(51) Int. Cl.
*F16L 19/02* (2006.01)
*F02C 7/22* (2006.01)
*B23B 41/00* (2006.01)
*B25F 5/00* (2006.01)
*F23R 3/00* (2006.01)

(52) U.S. Cl.
CPC .............. *F16L 19/02* (2013.01); *B23B 41/00* (2013.01); *B25F 5/00* (2013.01); *F02C 7/22* (2013.01); *F02C 7/222* (2013.01); *F05D 2230/60* (2013.01); *F05D 2230/80* (2013.01); *F05D 2240/35* (2013.01); *F23R 3/00* (2013.01); *F23R 2900/00017* (2013.01); *F23R 2900/00019* (2013.01)

(58) Field of Classification Search
CPC ...... F16L 19/0231; F16L 19/025; F16L 19/02
USPC ........................................... 285/39
See application file for complete search history.

(56) References Cited

U.S. PATENT DOCUMENTS

| 577,413 | A | * | 2/1897 | Bray | F16L 37/252 |
| | | | | | 285/360 |
| 977,472 | A | * | 12/1910 | Pilkington | F16L 37/091 |
| | | | | | 285/39 |
| 1,097,508 | A | * | 5/1914 | De Witt | F16L 37/091 |
| | | | | | 285/39 |
| 1,257,275 | A | | 2/1918 | Sartain | |
| 1,343,667 | A | | 6/1920 | Evensen | |
| 1,541,007 | A | | 6/1925 | Thiemer | |
| 2,089,168 | A | | 8/1937 | Brown | |

(Continued)

FOREIGN PATENT DOCUMENTS

WO WO-2019208841 A1 * 10/2019 .............. F16L 19/02

*Primary Examiner* — David Bochna
(74) *Attorney, Agent, or Firm* — Eversheds Sutherland (US) LLP (57) ABSTRACT

A hose connection system for connecting a hose to a gas turbine engine. The hose connection system may include a connection fitting and a connection tool. The connection fitting may include a first member to be attached to the gas turbine engine, a mating component to be attached to the hose, and a splined second member to be torqued onto the first member. The connection tool may include a drive wheel with a number of drive wheel splines such that the drive wheel splines torque the splined second member onto the first member.

17 Claims, 6 Drawing Sheets

(56) References Cited

U.S. PATENT DOCUMENTS

| | | | | |
|---|---|---|---|---|
| 2,795,985 | A | * | 6/1957 | Wilson .................. F16L 19/005 |
| | | | | 81/57.15 |
| 2,808,749 | A | | 10/1957 | Lampke |
| 2,907,242 | A | * | 10/1959 | Chakroff ................ F16L 19/00 |
| | | | | 81/57.15 |
| 3,201,149 | A | * | 8/1965 | Bragg ..................... F16L 19/00 |
| | | | | 285/39 |
| 3,604,292 | A | | 9/1971 | Sada |
| 4,473,317 | A | | 9/1984 | Bolang |
| 4,914,987 | A | * | 4/1990 | Isler ........................ B25B 13/48 |
| | | | | 81/56 |
| 5,058,929 | A | * | 10/1991 | Zentner ................ F16L 19/025 |
| | | | | 285/23 |
| 5,161,437 | A | | 11/1992 | Yasutomi et al. |
| 5,238,461 | A | | 8/1993 | Gotman |
| 5,354,246 | A | | 10/1994 | Gotman |
| 5,419,221 | A | | 5/1995 | Cole |
| 5,784,934 | A | | 7/1998 | Izumisawa |
| 6,464,260 | B1 | * | 10/2002 | Barrier .................... F16L 29/02 |
| | | | | 285/362 |
| 6,676,168 | B2 | * | 1/2004 | McAliley ................ F16L 41/00 |
| | | | | 285/139.2 |
| 7,077,436 | B1 | * | 7/2006 | Krywitsky .............. F16L 19/00 |
| | | | | 285/354 |
| 7,500,412 | B1 | * | 3/2009 | Maciejewski ........... B25B 13/48 |
| | | | | 74/424.71 |
| 7,686,342 | B2 | * | 3/2010 | Jennings ............. F16L 19/0231 |
| | | | | 285/39 |
| 2005/0212283 | A1 | * | 9/2005 | Frost .................... F16L 19/025 |
| | | | | 285/92 |
| 2009/0108579 | A1 | * | 4/2009 | Vorley .................... F16L 19/00 |
| | | | | 285/39 |

\* cited by examiner

HOSE CONNECTION SYSTEM

TECHNICAL FIELD

The present application and the resultant patent relate generally to gas turbine engines and more particularly relate to a hose connection system including a hose connection tool and a hose connection fitting used to install or remove a flexible hose to a turbine component such as a combustor can and elsewhere in a fast, efficient, and safe manner.

BACKGROUND OF THE INVENTION

Certain components in a gas turbine engine and other types of turbomachinery and the like may be difficult to assemble and/or repair. For example, a combustor can may be in communication with one or more flows of fuel and flows of air. The fuel hoses and the air hoses may be connected to the combustion can via a conventional flange joint. The hoses may be installed via flange bolting, swing clamp installation techniques, and the like. Such swing clamp installation may be challenging and time consuming. Moreover, the flange gaskets may be damaged if not installed properly. Such hose installation thus requires a significant crew size, installation time, and often leads to significant material scrap. Moreover, physical injury may be a possibility given the need to manually torque the connections at awkward angles and positions.

SUMMARY OF THE INVENTION

The present application and the resultant patent thus provide a hose connection system for connecting a hose to a gas turbine engine. The hose connection system may include a connection fitting and a connection tool. The connection fitting may include a first member to be attached to the gas turbine engine, a mating component to be attached to the hose, and a splined second member to be torqued onto the first member. The connection tool may include a drive wheel with a number of drive wheel splines such that the drive wheel splines torque the splined second member onto the first member.

The present application and the resultant patent further provide a method of attaching a hose to a gas turbine engine. The method may include the steps of welding a first member of a connection fitting to the gas turbine engine, positioning the hose through a splined second member of the connection fitting, welding a mating component of the connection fitting to the hose, and torqueing the splined second member onto the first member via a splined connection tool.

The present application and the resultant patent further provide a hose connection system for connecting a flexible hose to an endcover of a gas turbine engine. The hose connection system may include a connection fitting and a connection tool. The connection fitting may include a first member to be attached to the endcover, a mating component to be attached to the flexible hose, and a splined second member to be torqued onto the first member. The connection tool may include a drill and a drive wheel with a number of drive wheel splines such that the drive wheel splines torque the splined second member onto the first member.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
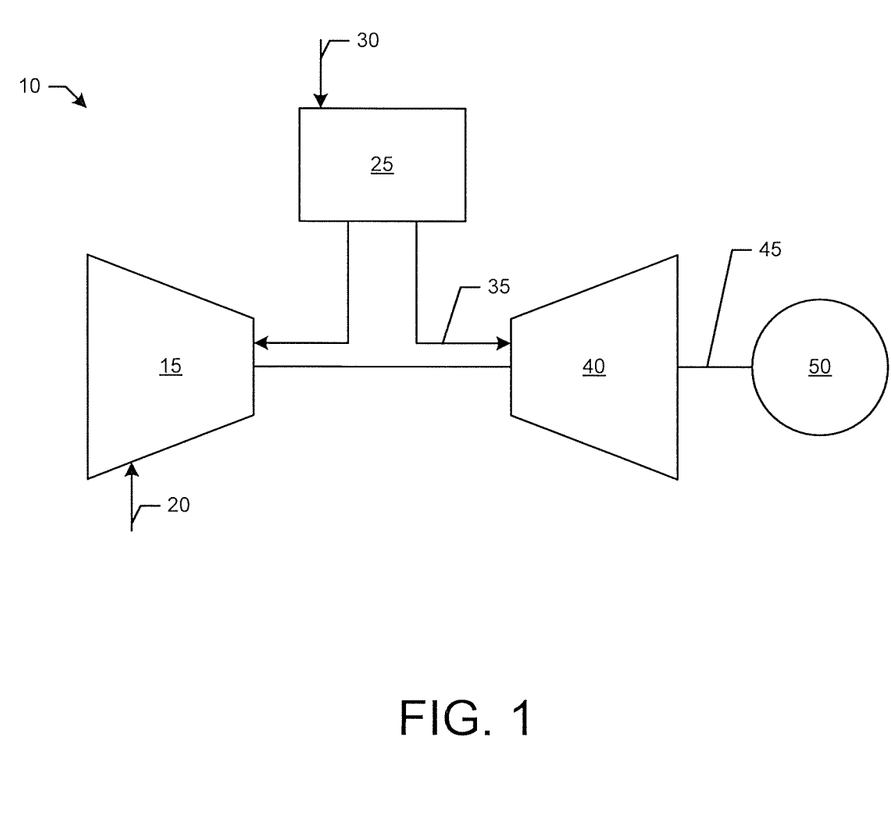
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
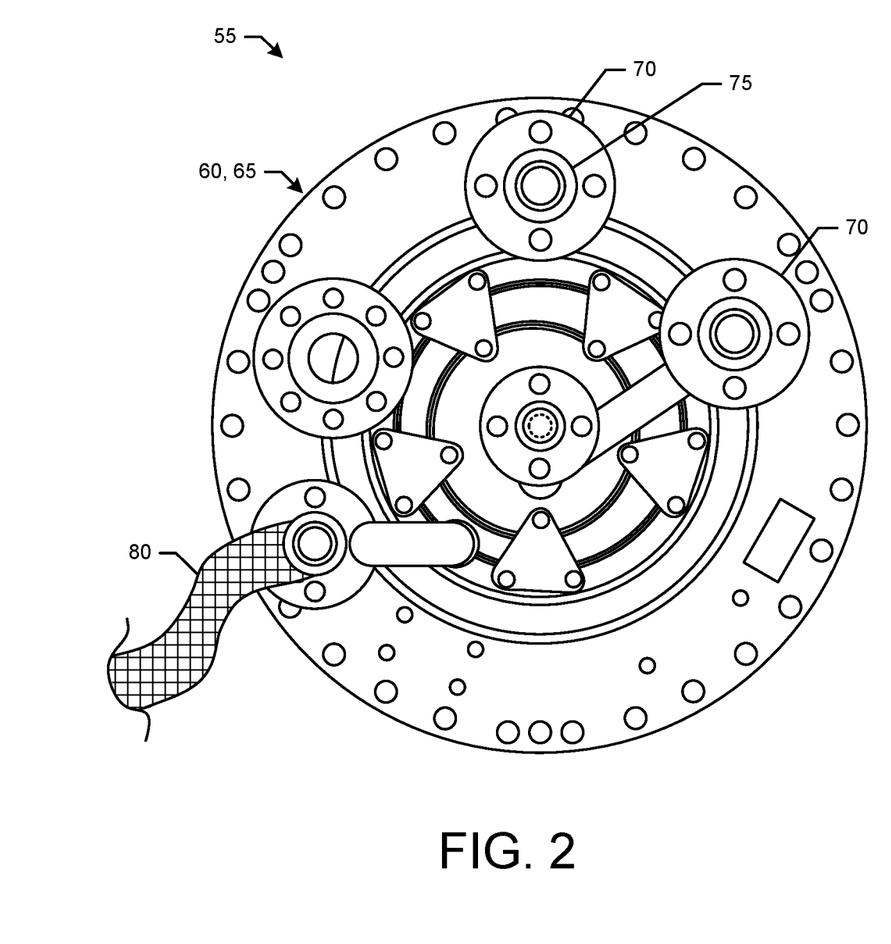
FIG. 2 is a plan view of an endcover of a known combustor can with a flexible hose.

FIG. 2 shows an example of a turbine component 55 such as an endcover 60 of a combustor can 65 of the combustor 25. The endcover 60 may have a of number fuel and air flanges 70. The flanges 70 may be conventional ANSI flanges (American National Standards Institute) and the like. Each flange 70 may define a connection port 75 therethrough. A flexible metallic hose 80 may be attached to each connection port 75 for the flow of fuel or the flow of air. The metallic hoses 80 may be of conventional design and may include tubes, pipes, and the like. Other types of fluid flows may be used herein. As described above, attaching or removing the metallic hoses 80 from the endcover 60 or elsewhere may be difficult and time consuming.

Figure 3:
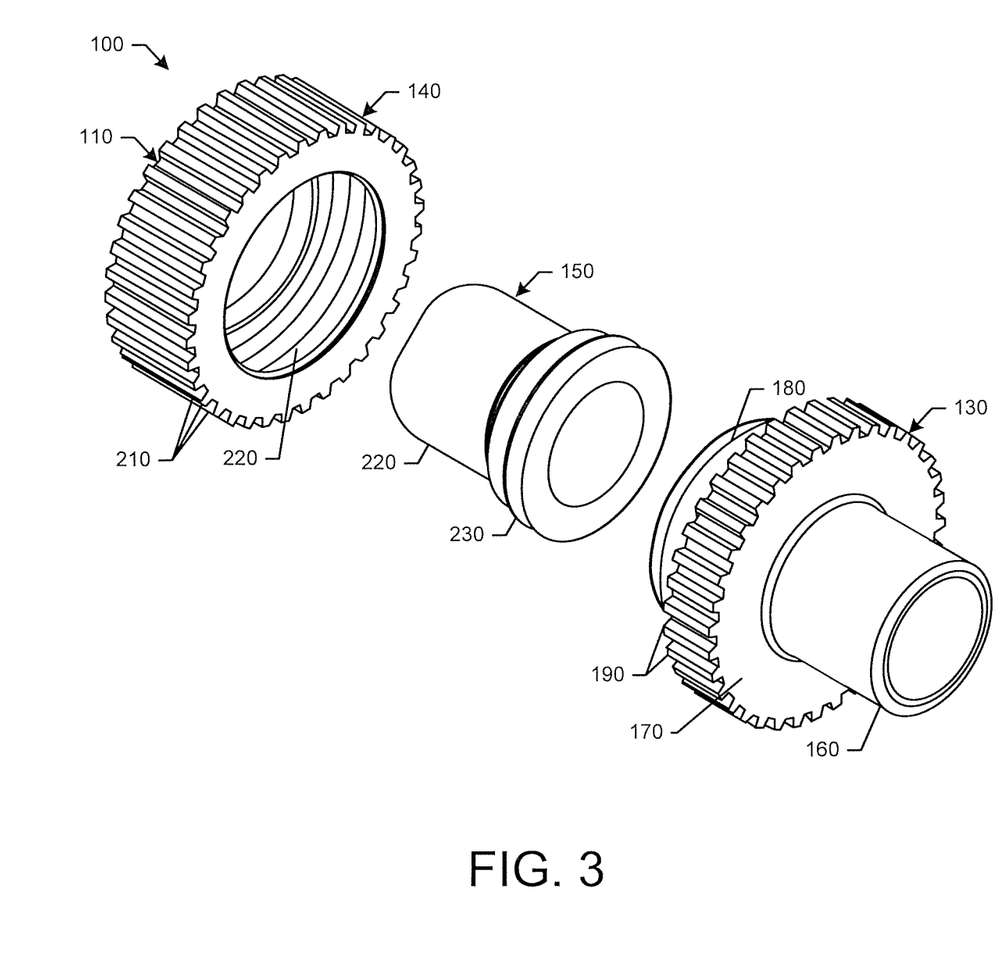
FIG. 3 is an exploded view of a connection fitting of a hose connection system as may be described herein.
Figure 4:
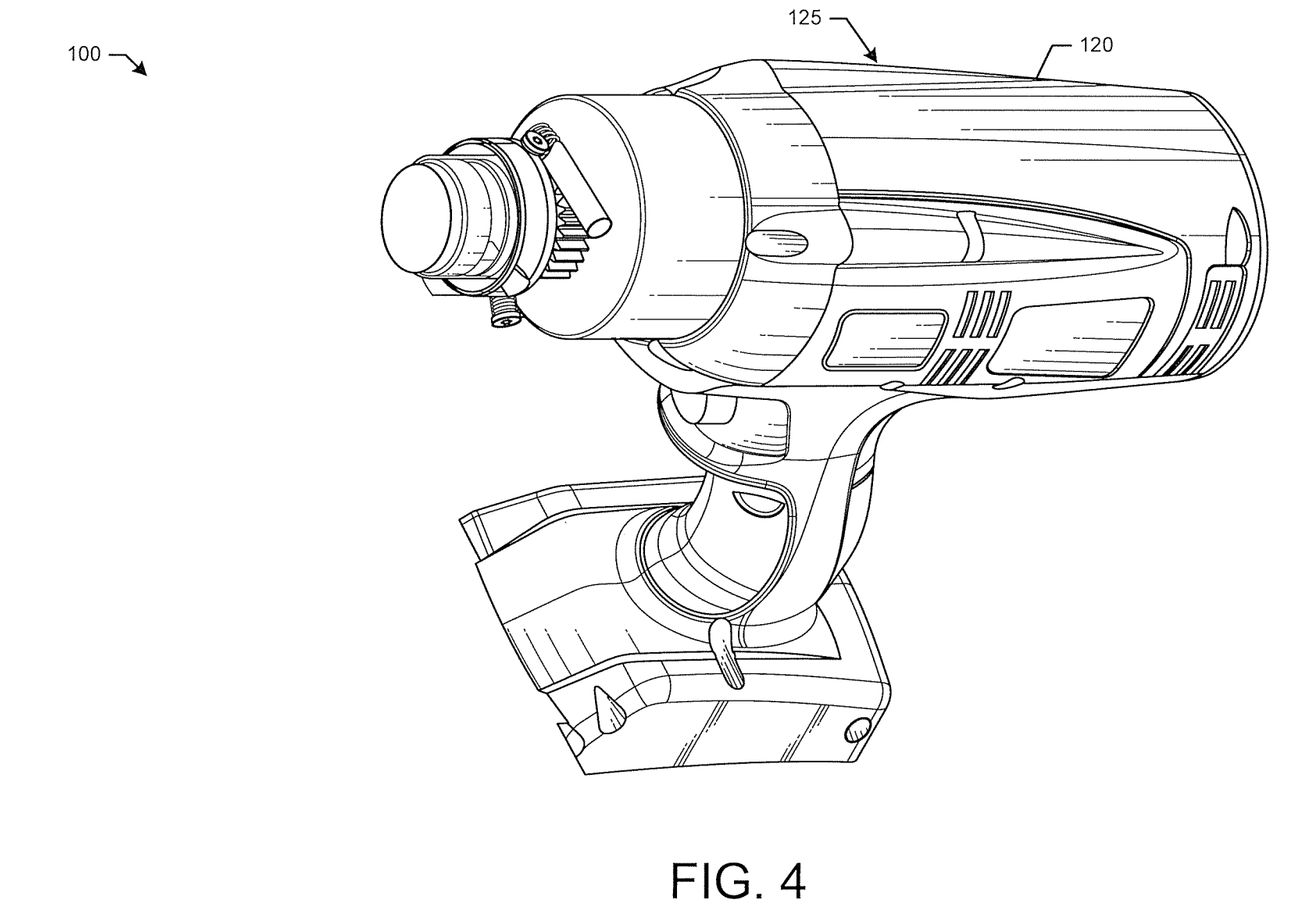
FIG. 4 is a perspective view of a drill for use with a hose connection tool used to install the connection fitting of FIG. 3.
Figure 5:
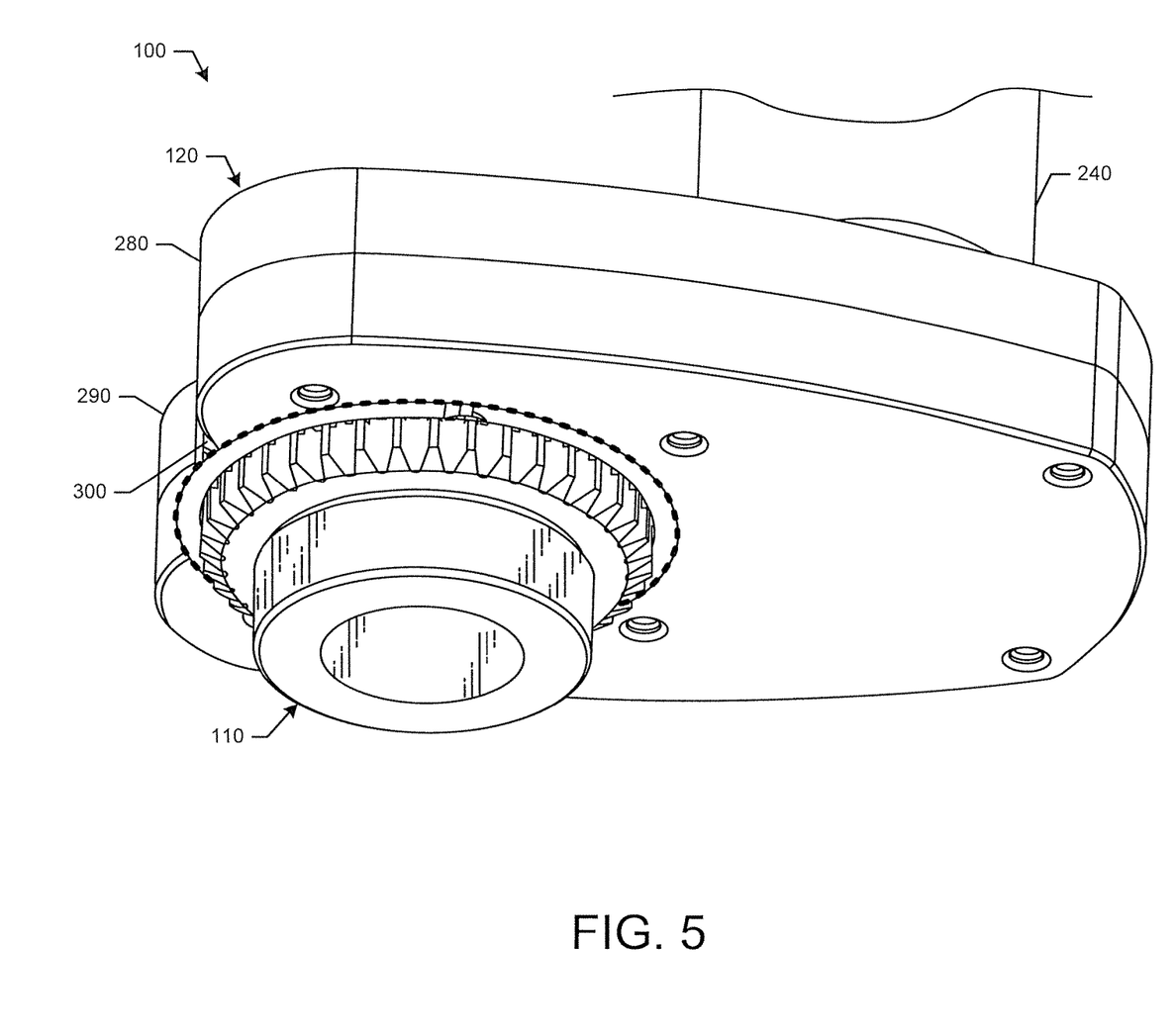
FIG. 5 is a perspective view of a hose connection tool used to install the connection fitting of FIG. 3.

FIGS. 3-5 show a hose connection system 100 as may be described herein. The hose connection system includes a connection fitting 110 and a related connection tool 120. FIG. 3 shows an example of the connection fitting 110. The connection fitting 110 may include a stationary or a first member 130, a rotating or a second member 140, and a mating component 150 therebetween. The first member 130 may include a first member hollow tube 160, a first member flange 170 surrounding the first member hollow tube 160, and a first member threaded portion 180. The first member flange 170 may include a number of first member splines 190 extending thereabout. Any number of the first member splines 190 may be used. The second member 140 may be tubular in shape with a second member threaded portion 200 and a number of second member splines 210 extending thereabout. Any number of the second member splines 210 may be used. The first member splines 190 and the second member splines 210 may be complimentarily shaped. The first member threaded portion 180 is configured to accommodate the second member threaded portion 200. The mating component 150 may include a mating component hollow tube 220 and a mating component flange 230. The mating component 150 may be sized to fit within the first member 130 and the second member 140. Other components and other configurations may be used herein.

Figure 6:
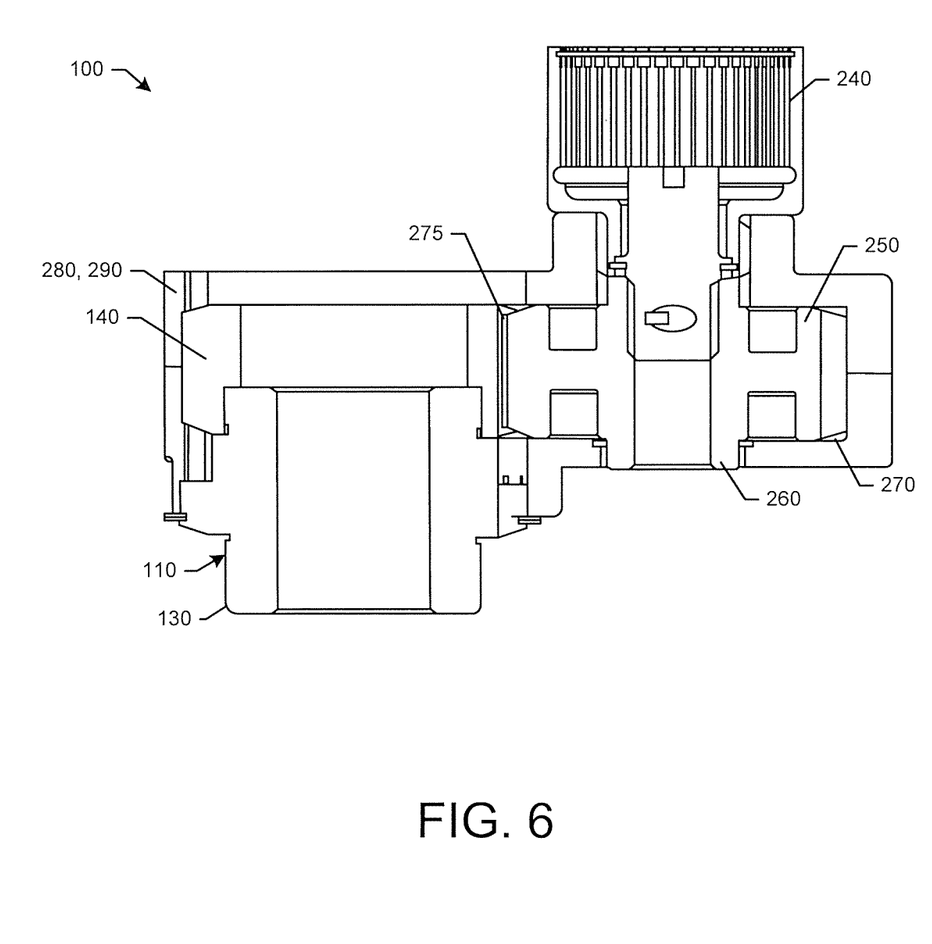
FIG. 6 is a sectional view of the hose connection tool of FIG. 5 with the connection fitting therein.

FIGS. 4-6 shown an example of a connection tool 120 for use with the connection fitting 110. The connection tool 120 may be powered by a drill 125. The drill 125 may be a conventional high torque drill. The drill 125 may be battery powered for use in the field. Other types of power sources may be used herein. The drill 125 may be reversible. Other types of torque application devices may be used herein.

The connection tool 120 may include a drill adapter 240 sized to accommodate the drill head and rotate therewith. The connection tool 120 further may include a drill drive pinion or drill drive wheel 250. The drill drive wheel 250 may rotate about a drive wheel axle 260 within a drive wheel chamber 270. The drill drive wheel 250 may have a number of drill drive wheel splines 275. Any number of drill drive wheel splines 275 may be used herein. Other components and other configurations may be used herein.

The connection tool 120 may include a pair of connection arms, a first connection arm 280 and a second connection arm 290. The connection arms 280, 290 may define a fitting aperture 300 therebetween. The fitting aperture 300 may be sized to accommodate the connection fitting 110 therein. The drill drive wheel splines 275 drive wheel splines 275 may be sized to accommodate the splines 190, 210 of the connection fitting 110. The connection arms 280, 290 may be hinged for ease of access. Other configurations include a static nut with a rotating fitting, a rotating nut with a static fitting (previously mentioned case), and a counter rotational assembly where both the nut and the fitting are mobile. Other components and other configurations may be used herein.

In use, the first member 130 of the connection fitting 110 may be welded about the connection port 75 of the flange 70 of the combustor can 65 or elsewhere with respect to the gas turbine engine 10. Conventional welding techniques may be used. Other connection means such as threaded components, formed components, and the like may be used. The flexible hose 80 may be passed through the second member 140 of the connection fitting 110. The mating component 150 may be welded to the flexible hose 80 and positioned between the first member 130 and the second member 140. Conventional welding techniques may be used. The first member 130 and the second member 140 may be connected together via the first member threaded portion 180 and the second member threaded portion 200.

The connection tool 120 then may apply the correct amount of torque. The first connection arm 280 and the second connection arm 290 may accept the connection fitting 110 within the fitting aperture 300. The second member splines 210 and the drill drive wheel splines 275 may align such that the drill drive wheel splines 275 may torque the connection fitting 110. Specifically, the drill 125 may drive the drill drive wheel 250 so as to rotate the second member 140 of the connection fitting 110 onto the first member 130 with the correct torque. Likewise, the drill 125 may drive the connection tool 110 in reverse to remove the connection fitting 110.

The hose connection system 100 thus quickly installs or removes the connection fitting 110 and the flexible hose 80 from the combustor can 65 or elsewhere in an automated and safe manner. The aligned splines 210, 275 enable the connection tool 120 to torque the connection fitting 110 as appropriate without damaging the gasket or other fitting components. The hose connection system 100 thus eliminates the conventional flange bolting and swing clamp installations so as to reduce the associated crew time and scrap. Although the hose connection system 100 has been described in terms of the gas turbine engine 10, the hose connection system 100 may be used with any type of static member. Moreover, the hose connection system 100 may be used with any fluid not limited to fuel and air.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A hose connection system for connecting a hose to a gas turbine engine, comprising:
   a connection fitting;
   the connection fitting comprising a first member to be attached to the gas turbine engine, a mating component welded to the hose, and a splined second member to be torqued onto the first member;
   wherein the splined second member comprises a plurality of second member splines extending in a radial direction;
   wherein the mating component is positioned between the first member and the splined second member; and
   a motorized connection tool;
   the motorized connection tool comprising a drive wheel with a plurality of drive wheel splines;
   wherein the plurality of drive wheel splines torque the splined second member onto the first member; wherein the first member comprises a plurality of first member splines.

2. The hose connection system of claim 1, wherein the gas turbine engine comprises an endcover.

3. The hose connection system of claim 1, wherein the first member comprises a first member threaded portion and the second member comprises a complimentary second member threaded portion.

4. The hose connection system of claim 1, wherein the motorized connection tool comprises a drill.

5. The hose connection system of claim 4, wherein the drill comprises a reversible drill.

6. The hose connection system of claim 4, wherein the motorized connection tool comprises a drill adapter in communication with the drill and the drive wheel.

7. The hose connection system of claim 1, wherein the drive wheel comprises a drive wheel axel and wherein the drive wheel rotates about the drive wheel axis within a drive wheel chamber.

8. The hose connection system of claim 1, wherein the plurality of second member splines cooperate with the plurality of drive wheel splines.

9. The hose connection system of claim 1, wherein the motorized connection tool comprises a first connection arm and a second connection arm.

10. The hose connection system of claim 9, wherein the first connection arm and the second connection arm are hinged.

11. The hose connection system of claim 9, wherein the first connection arm and the second connection arm define a fitting aperture therebetween for the connection fitting.

12. The hose connection system of claim 9, wherein the first connection arm and the second connection arm hold the first member stationary while torqueing the second member.

13. The hose connection system of claim 1, wherein the hose comprises a flexible gas hose or a flexible air hose.

14. A hose connection system for connecting a flexible hose to an endcover of a gas turbine engine, comprising:
  a connection fitting;
  the connection fitting comprising a first member to be attached to the endcover, a mating component welded to the flexible hose, and a splined second member to be torqued onto the first member;
  wherein the splined second member comprises a plurality second member splines extending in a radial direction;
  wherein the mating component is positioned between the first member and the splined second member; and
  a motorized connection tool;
  the motorized connection tool comprising a drill and a drive wheel with a plurality of drive wheel splines;
  wherein the plurality of drive wheel splines torque the splined second member onto the first member; wherein the first member comprises a plurality of first member splines.

15. The hose connection system of claim 14, wherein the first member comprises a first member threaded portion and the second member comprises a complimentary second member threaded portion.

16. The hose connection system of claim 14, wherein the drill comprises a reversible drill.

17. The hose connection system of claim 14, wherein the motorized connection tool comprises a drill adapter in communication with the drill and the drill drive wheel.

* * * * *